(12) United States Patent
Lee et al.

(10) Patent No.: US 8,935,442 B2
(45) Date of Patent: Jan. 13, 2015

(54) ELECTRONIC DEVICE AND DATA CONTROL METHOD THEREOF

(71) Applicant: Samsung Electronics Co., Ltd., Gyeonggi-do (KR)

(72) Inventors: Hyeon-ji Lee, Seoul (KR); Chang-soo Lee, Seoul (KR); Sang-hee Lee, Seoul (KR); Dong-heon Lee, Seoul (KR); Joon-ho Phang, Seoul (KR); Yeo-ri Yoon, Cheongju-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/851,613

(22) Filed: Mar. 27, 2013

(65) Prior Publication Data

US 2013/0212476 A1 Aug. 15, 2013

Related U.S. Application Data

(63) Continuation of application No. 12/763,867, filed on Apr. 20, 2010, now Pat. No. 8,417,843.

(30) Foreign Application Priority Data

Sep. 28, 2009 (KR) ........................ 10-2009-0091642

(51) Int. Cl.
G06F 3/00 (2006.01)
G06F 3/0484 (2013.01)
G06F 9/445 (2006.01)
G06F 13/38 (2006.01)
G06F 13/10 (2006.01)
G06F 13/00 (2006.01)

(52) U.S. Cl.
CPC ............. *G06F 3/0484* (2013.01); *G06F 9/445* (2013.01); *G06F 13/385* (2013.01); *G06F 13/10* (2013.01)

USPC ........... 710/22; 710/5; 710/8; 710/15; 710/33

(58) Field of Classification Search
None
See application file for complete search history.

(56) References Cited

U.S. PATENT DOCUMENTS

| 2005/0047756 | A1 | 3/2005 | Evans |
| 2007/0147779 | A1* | 6/2007 | Takakura et al. ............... 386/95 |
| 2007/0198862 | A1 | 8/2007 | Sato et al. |
| 2007/0269189 | A1 | 11/2007 | Russ |

(Continued)

FOREIGN PATENT DOCUMENTS

| EP | 1 764 702 A1 | 3/2007 |
| JP | 2004-62347 A | 2/2004 |
| KR | 10-2008-0073552 A | 8/2008 |

OTHER PUBLICATIONS

Extended European Search Report issued in counterpart Application No. 10172293.2, dated Oct. 1, 2010.

(Continued)

*Primary Examiner* — Scott Sun
(74) *Attorney, Agent, or Firm* — Sughrue Mion, PLLC (57) ABSTRACT

An electronic device and data control method are provided. The electronic device includes a connector which is connected to an external storage medium storing media data therein; an identification unit which identifies a storage identifier (ID) of the external storage medium connected to the connector; and a controller which performs a media function corresponding to the media data stored in the external storage medium whose storage ID is identified by the identification unit.

24 Claims, 5 Drawing Sheets

(56) References Cited

U.S. PATENT DOCUMENTS

2010/0197411 A1* 8/2010 Eyzaguirre et al. ............. 463/43
2012/0114313 A1* 5/2012 Phillips et al. ................. 386/298

OTHER PUBLICATIONS

Communication dated Feb. 20, 2012 issued by the European Patent Office in counterpart European Patent Application No. 10172293.2.
Farrell, Stephen, Portable Storage and Data Loss, Jun. 2008, ieee.org [online, accessed on Jul. 17, 2011], UR: http://ieeexplore.ieee.org/stamp/stamp.jsp?tp=&arnumber=4510888.
USPTO Non-Final Office Action issued in Parent U.S. Appl. No. 12/763,867, dated Jul. 20, 2011.
USPTO Non-Final Office Action issued in Parent U.S. Appl. No. 12/763,867, dated Dec. 20, 2011.
USPTO Final Office Action issued in Parent U.S. Appl. No. 12/763,867, dated Jul. 16, 2012.
USPTO Office Action dated Sep. 23, 2014 issued in co-pending U.S. Appl. No. 14/246,936.

* cited by examiner

ELECTRONIC DEVICE AND DATA CONTROL METHOD THEREOF

CROSS-REFERENCE TO RELATED APPLICATION

This application is a Continuation Application based on U.S. application Ser. No. 12/763,867, with a filing date of Apr. 20, 2010, which claims priority from Korean Patent Application No. 10-2009-0091642, filed on Sep. 28, 2009, in the Korean Intellectual Property Office, the disclosures of which are herein incorporated by reference.

BACKGROUND

1. Field

Apparatuses and methods consistent with exemplary embodiments relate to an electronic device and a data control method thereof, and more particularly, to an electronic device and a data control method thereof which provides for identification of the electronic device and for distinguishing among electronic devices.

2. Description of the Related Art

An increasing number of people use an external storage medium for the convenience of portability. Further, the external storage medium provides a large capacity in memory and is capable of storing therein large multimedia files including, for example, text files, music files, video files, and/or photo files, and the like. However, in most cases, the external storage medium does not have identification (ID) information. Even if the external storage medium has ID information, it is not easy to identify and distinguish among individual external storage media since the storage media manufactured by the same manufacturer have the same ID information.

SUMMARY

According to an aspect of exemplary embodiments, there is provided an electronic device including a connector which is connected to an external storage medium storing media data therein; an identification unit which identifies a storage identifier (ID) of the external storage medium connected to the connector; and a controller which performs a media function corresponding to the media data stored in the external storage medium whose storage ID is identified by the identification unit.

The controller may play the media data from a point of time at which the play was suspended if the media data comprise an image signal or an audio signal.

The electronic device may further include an ID generator, and the controller, if the storage ID is not identified by the identification unit, may control the ID generator to generate a storage ID of the external storage medium, and stores the storage ID is not identified in the external storage medium.

The electronic device may further include a storage, and the controller may store in the storage the storage ID generated by the ID generator and media information about the media data stored in the storage medium.

The electronic device may further include a display and a user interface (UI) generator, and the controller may control the UI generator to generate a UI displaying information about the media data, and display the UI on the display.

The information about the media data may include, for example, a type, a size or a name of the data, or a combination thereof, a list of data played during a certain time, time information on a point of time at which the play was suspended, a suspended location, or a thumb nail image if the media data comprises data comprising an image signal.

According to another aspect of exemplary embodiments, there is provided a data control method of an electronic device, the method including identifying a storage identifier (ID) of an external storage medium connected to the electronic device by an identification unit; and performing a media function corresponding to media data stored in the external storage medium having the identified storage ID.

Performing the media function may include playing the media data from a point of time at which play was suspended if the media data comprises an image signal or an audio signal.

The method may further include generating a storage ID of the external storage medium if the storage ID of the external storage medium is not identified.

The method may further include storing the generated storage ID and media information about the media data.

The method may further include generating a user interface (UI) for displaying the media information of the media data and displaying the UI on the display.

The media information of the media data may include, for example, a type, a size or a name of the data, or a combination thereof, a list of data played during a certain period, time information on a point of time at which play was suspended, a suspended location, or a thumb nail image.

BRIEF DESCRIPTION OF THE DRAWINGS

The above and/or other aspects will become apparent and more readily appreciated from the following description of exemplary embodiments, taken in conjunction with the accompanying drawings of which.

DETAILED DESCRIPTION

Hereinafter, exemplary embodiments of the present invention will be described with reference to the accompanying drawings, wherein like numerals refer to like elements and repetitive descriptions will be omitted as necessary.

Figure 1:
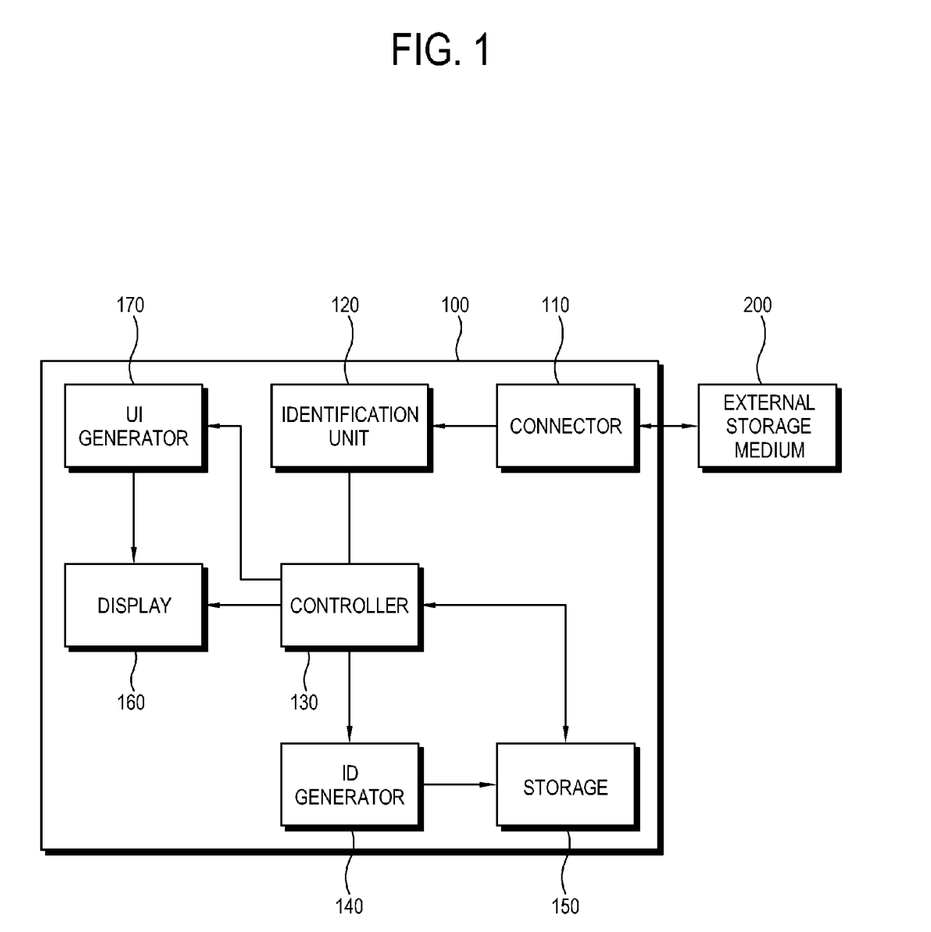
FIG. 1 is a block diagram of an electronic device according to an exemplary embodiment.

FIG. 1 is a block diagram of an electronic device according to an exemplary embodiment.

An electronic device 100 includes a connector 110, an identification unit 120, and a controller 130. The electronic device 100 may further include an identification (ID) generator 140, a storage 150, a user interface (UI) generator 170 and a display 160, as shown in FIG. 1.

The electronic device 100 may be any type of electronic device which is capable of playing media data. For example, the electronic device 100 be a set top box such as a TV, a DTV, a DVR, a DVD player or a BD player, or a PVR, a PC, an audio component, or an electronic frame, or the like.

The connector 110 is connected to an external storage medium 200 which stores media data therein, and meets standards for a port of the external storage medium.

The identification unit 120 reads the connector 110 in order to detect and identify a storage ID of the external storage medium connected to the connector 110. The storage ID of the external storage medium 200 may include an ID assigned by the electronic device 100 according to an exemplary embodiment, or an ID assigned by another electronic device other than a manufacturer ID assigned by the manufacturer of the external storage medium 200. If the storage ID of the external storage medium 200 is assigned by another electronic device, the identification unit 120 may transmit the storage ID to the controller 130 (to be described later) and the controller 130 may control the storage 150 to store therein the storage ID assigned by another electronic device together with information about media data stored in the external storage medium 200 corresponding to the ID. Accordingly, the storage ID of the external storage medium 200 may include any of the IDs assigned by a host electronic device other than the manufacturer ID information assigned by the manufacturer of the external storage medium 200. For example, the storage ID may be a device specific ID that uniquely identifies the external storage medium 200 from another external storage medium. Alternatively, the storage ID may be a group ID or some other ID, other than a manufacturer ID.

The identification unit 120 identifies information about the media data stored in the external storage medium 200 connected to the connector 110 and transmits the information to the controller 130.

For example, the identification unit 120 may identify whether the external storage medium 200 has stored therein data whose play was suspended at an earlier time, and transmit the identified data to the controller 130 if the external storage medium 200 whose storage ID is identified is connected.

The controller 130 may perform a function corresponding to the media data stored in the external storage medium 200 whose storage ID is identified by the identification unit 120.

The media data may include data including an audio signal, data including an image signal, or photo or image data. Thus, if the media data is data including an image signal or an audio signal, the function may include a function to play again the data from a point of time at which play was previously suspended. If the media data is photo or image data, the function may include a function to display again using a viewer program a file that was displayed at an earlier time.

The ID generator 140 may generate a storage ID of an external storage medium 200, whose storage ID is not identified by the identification unit 120. Even though the external storage medium 200 may have inherent ID information assigned by its manufacturer, other external storage media which are manufactured by the same manufacturer have the same ID. In such case, the ID generator 140 generates a storage ID for the external storage medium 200. The storage ID of the external storage medium 200 that is generated is stored in the external storage medium 200 by the controller 130. Accordingly, when the external storage medium 200 which has the storage ID assigned is connected to the electronic device 100 in the future, the electronic device 100 may identify the external storage medium 200 by the storage ID.

The storage 150 may store therein the storage ID generated by the ID generator 140 and information regarding the media data stored in the external storage medium 200. Thus, whenever the external storage medium 200 having the storage ID assigned is connected to the electronic device 100, the identification unit 120 may identify, for example, the storage ID and a type and a number of media data stored in the external storage medium 200 and update the media data information stored in the storage 150.

The information of the media data may include, for example, a type, a size or a name of the data, or a combination thereof, a list of data played during a certain time, time information on a point of time at which play of the media data was suspended, and a location related to a point of time at which play of the media data was suspended. The information of the media data may include a thumb nail image, in a case, for example, in which the media data include data includes an image signal or image data including photos or images, or the like.

Accordingly, the storage 150 may store therein information regarding any or all of the media data stored in the external storage medium 200 having the storage ID assigned.

If at least one of media data of the external storage medium 200 having the storage ID assigned is suspended from being played, the storage 150 may store therein data whose play was suspended, time information on a point of time at which play of the media data was suspended, information regarding a location at which play of the media data was suspended, and/or a thumb nail image of the media data at a point of time at which play was suspended.

The display 160 may include various display panels such as, for example, a liquid crystal display (LCD), a light emitting diode (LED) or a plasma display panel (PDP), which displays thereon an image signal received from the outside.

The electronic device 100 according to an exemplary embodiment may further include an image signal processor (not shown) to process an image signal received from the outside to be displayed on the display 160. The electronic device according to an exemplary embodiment may further include an audio signal processor (not shown) and a speaker (not shown) to process an audio signal received from the outside and output the audio signal to the speaker.

The UI generator 170 may generate a UI to display information about media data stored per storage ID in the storage 150. The controller 130 may control the display 160 to display thereon the generated UI.

The electronic device 100 according to an exemplary embodiment may include a user input (not shown) for a user to select one of the displayed UI. The user input may include a button provided in the electronic device 100, a touch panel for a touch screen, a remote controller connected to the electronic device 100 in a wired/wireless manner, or a keyboard or other various means to select one of the UI displayed on the display 160.

If the media data includes data including an image signal, the information about the media data may include, for example, a type, a size or a name of the data or a combination thereof, a list of data played during a certain period, time information about a point in time at which play was suspended, information about a location at which play was suspended, or a thumb nail image, or the like. The certain period may be predetermined.

If the media data includes data including an audio signal, the information of the media data may include, for example, a type, a size, or a name of the data or a combination thereof, a list of data played during a certain period, time information about a point in time at which play was suspended, or information about a location at a point in time at which play was suspended, or the like.

If the media data includes data including a photo or an image, the information of the media data may include, for example, a type, a size or a name of the data or a combination thereof, or information about a portion of the data or a location in the data which was last viewed or a thumb nail image, or the like.

The external storage medium 200 may store therein any or all data which is viewed by an application program installed in the host electronic device, e.g., a universal serial bus (USB) or an external hard disc drive.

Figure 2:
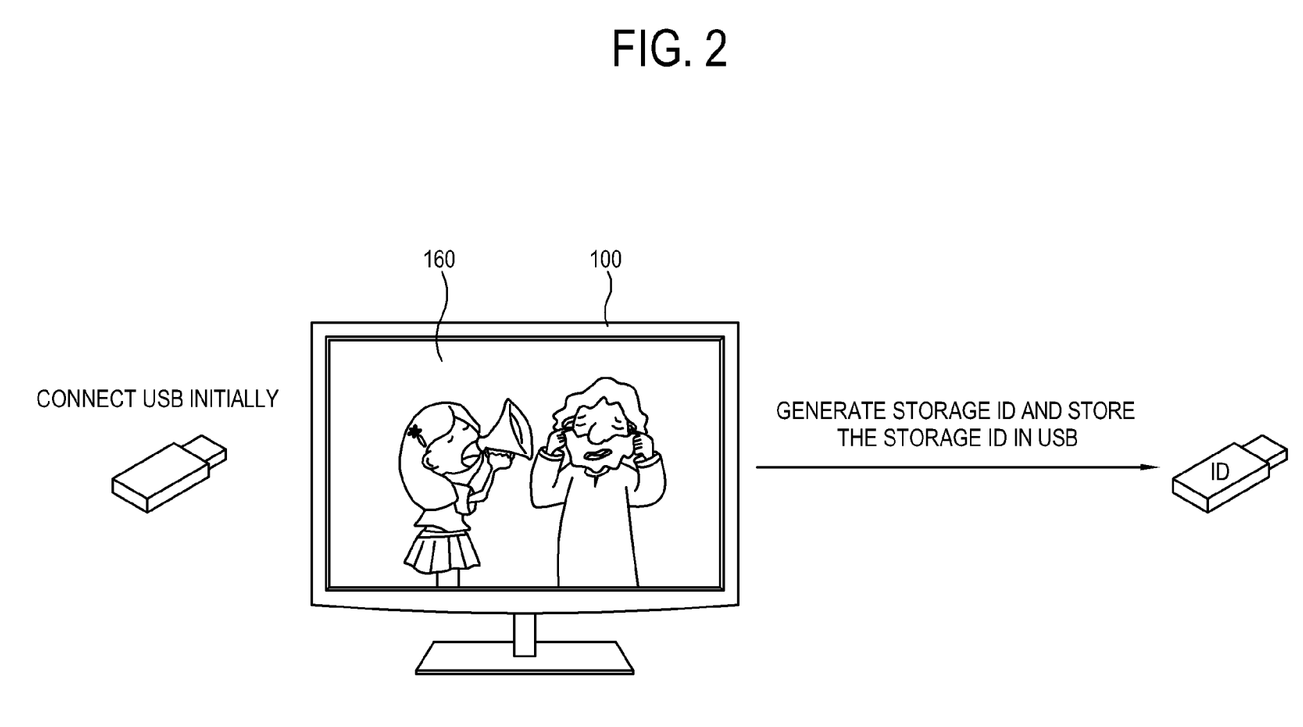
FIG. 2 illustrates an example of assigning a storage identifier (ID) to an external storage medium according to an exemplary embodiment.

FIG. 2 is an example of assigning a storage ID to the external storage medium 200 according to an exemplary embodiment.

As shown therein, if an external storage medium 200, e.g., a universal serial bus (USB) device, is initially connected to the electronic device 100 through the connector 110, the identification unit 120 of the electronic device 100 detects whether the external storage medium 200 has a storage ID. If a storage ID is not detected and identified, the identification unit 120 transmits a signal to the controller 130 to inform the controller that the external storage medium 200 does not have a storage ID. Then, the controller 130 controls the ID generator 140 to generate a storage ID to be assigned to the external storage medium 200, in this case, the USB device. The controller 130 stores the generated storage ID in the external storage medium 200, i.e., the USB device.

The controller 130 controls the storage 150 to store therein the generated storage ID and information about the media data stored in the external storage medium 200 which is identified by the identification unit 120.

Figure 3:
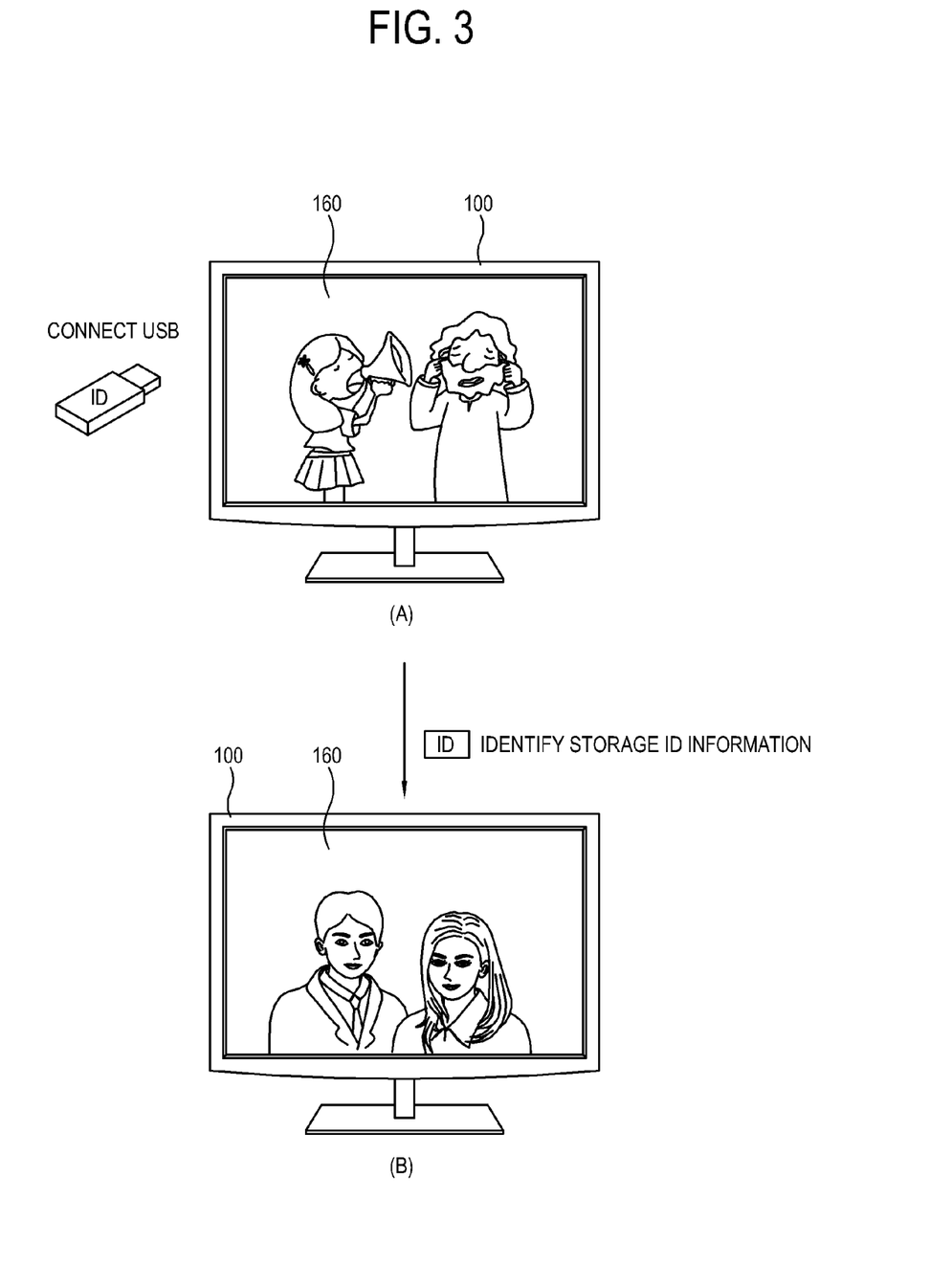
FIG. 3 illustrates an example of connecting a connector to the external storage medium, whose storage ID is identified, according to an exemplary embodiment.

FIG. 3 is an example of connecting the external storage medium 200, which already has a storage ID, to the connector 110 according to an exemplary embodiment.

As shown in FIG. 3, if the external storage medium 200 that already has a storage ID assigned, for example, a USB device having a storage ID stored therein, is connected to the connector 110 of the electronic device 100, the identification unit 120 detects and identifies the storage ID, and the controller 130 confirms functionality related to the data stored on the external storage medium 200, i.e., the USB device. For example, the controller 130 may confirm the data whose play was last suspended from the information of the media data corresponding to the storage ID stored in the storage 150. If the data, whose play was last suspended, includes data including an image signal, the controller 130 plays the data from the point of time at which the play was suspended. For example, an electronic device 100 has a display 160 on which a mother and child image is being displayed as a background image (refer to (a) in FIG. 3). When a USB device which has a storage ID assigned is connected to the connector 110 of the electronic device 100, the display 160 displays thereon an image of a couple (refer to (b) in FIG. 3) which was last suspended from being played.

If the data whose play was last suspended includes data including an audio signal, the controller 130 plays the data from a point of time at which the play was suspended. If the data whose play was last suspended includes photo or image data, a lastly-viewed photo or image is viewed.

Figure 4:
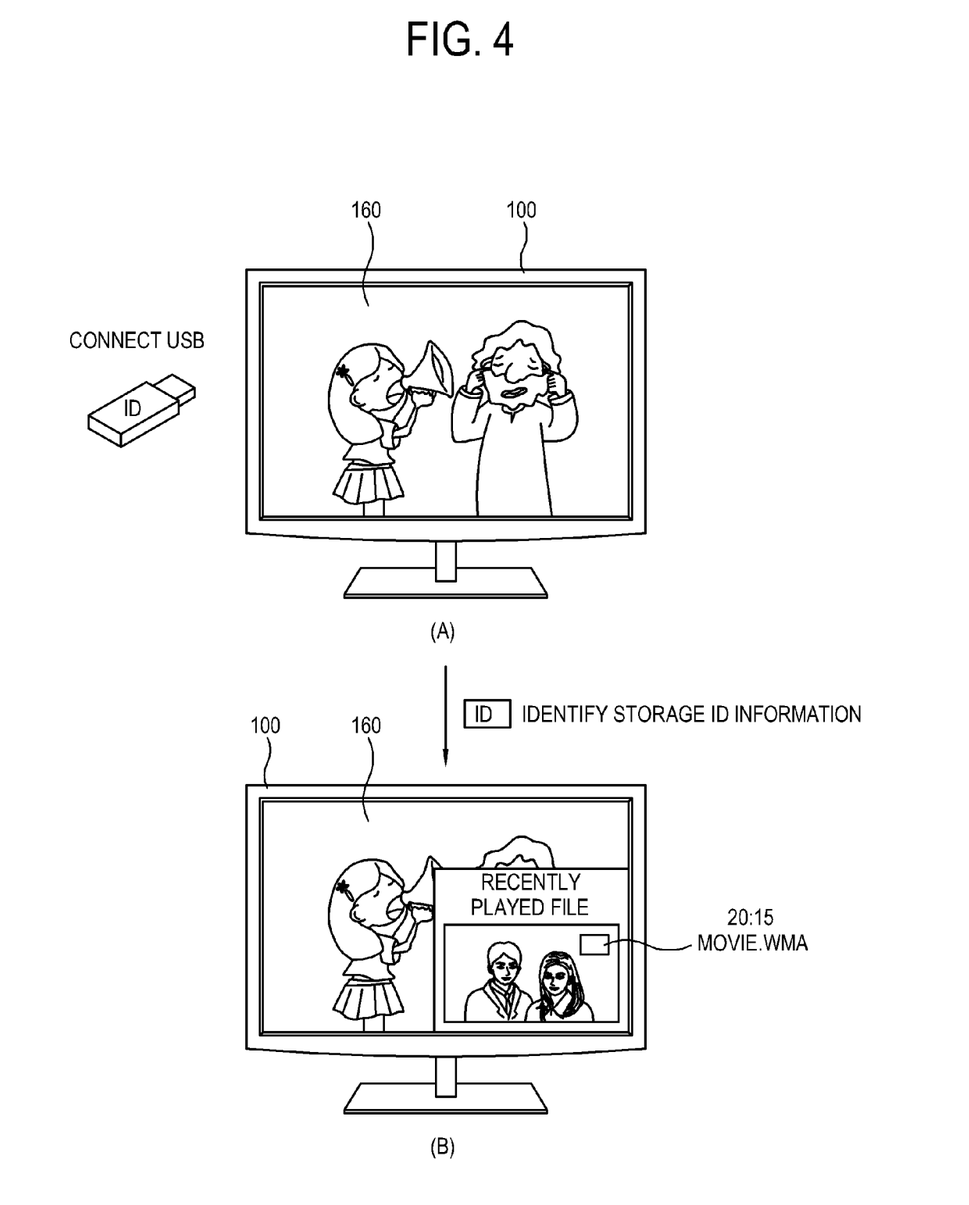
FIG. 4 illustrates an another example of connecting a connector to the external storage medium, whose storage ID is identified, according to an exemplary embodiment.

FIG. 4 is an another example of connecting the external storage medium 200, which already has a storage ID, to the connector 110 according to an exemplary embodiment.

As shown in FIG. 4, if the external storage medium 200 having the storage ID assigned, e.g., a USB device, is connected to the connector 110 of the electronic device 100, the identification unit 120 detects and identifies the storage ID and the controller 130 confirms the data whose play was last suspended based on the information of the media data corresponding to the storage ID stored in the storage 150. If the data whose play is last suspended includes data including an image signal, the controller 130 controls the UI generator 170 to generate a UI and display the UI on the screen. The UI may, for example, display information indicating the type, size or name of the data or a combination thereof, time information regarding a point of time at which play was suspended, information indicating a location at which play was suspended, or a thumb nail image at a point of time at which play was suspended. The controller 130 controls the display 160 to display thereon the generated UI. Thus, if, for example, the generated UI is selected by a user input, the image data may be played again from the point of time at which the play was suspended.

For example, an electronic device 100 has a display 160 on which is displayed an image of a mother and child as a background image (refer to (a) in FIG. 4). When a USB device which has a storage ID assigned is connected to the connector 110 of the electronic device 100, the display 160 displays thereon a UI showing the type of data whose play was last suspended, and a thumb nail image of the image of the couple at a point of time at which play was last suspended (refer to (b) in FIG. 4). Accordingly, if the UI is selected by a user input, the image data is played again from a point of time where the play was suspended.

If the data whose play was last suspended includes data including an audio signal, the controller 130 controls the UI generator 170 to generate a UI displaying a type, a name or a size of the data or a combination thereof, time information about a point of time at which play was suspended, or information about a location at which play was suspended, and controls the display 160 to display thereon the generated UI. If the generated UI is selected by a user input, the audio data is played again from the point of time at which play was suspended.

If the data whose play was last suspended includes photo or image data, the controller 130 controls the UI generator 170 to generate a UI displaying a type, a name or a size of the data or a combination thereof, or a thumb nail image of a photo or an image which was last viewed, and controls the display 160 to display thereon the generated UI. If the generated UI is selected by a user input, the photo or image data is displayed.

The controller 130 may generate a list of data played or viewed during a certain time from the media data stored on the external storage medium 200 whose storage ID is identified, and control the UI generator 170 to generate a UI displaying a type, a name or a size or a combination thereof of the data included in the list, time information regarding a point of time at which play was suspended, information regarding a location at which the play was suspended, or a thumb nail image at a point of time at which play was suspended. The controller 130 controls the display 160 to display thereon the generated UI and plays the data selected from the UI by a user input from a point of time at which play was suspended.

A data control method according to an exemplary embodiment will not be described. The data control method includes detecting and identifying a storage ID of the external storage medium connected to the connector 110 by the identification unit 120; and performing a function corresponding to the media data stored in the external storage medium 200 having the identified storage ID. If the media data includes data including an image signal or an audio signal, the performing the function includes playing data including the image signal or the audio signal from a point of time at which play was suspended.

The data control method may further include generating a storage ID of the external storage medium 200 if the storage ID of the external storage medium 200 is not detected and identified.

The data control method may further include storing the generated storage ID and information of media data stored in the storage medium 200.

The data control method of the electronic device 100 may further include generating a UI for displaying the information of the media data and displaying the UI on the display 160. If the media data include data including an image signal, the information of the media data may include a type, a size or a name or a combination thereof of the data, a list of data played during a certain time, time information regarding a point of time at which play was suspended, information regarding a location at a point of time at which play was suspended or a thumb nail image, or the like.

Figure 5:
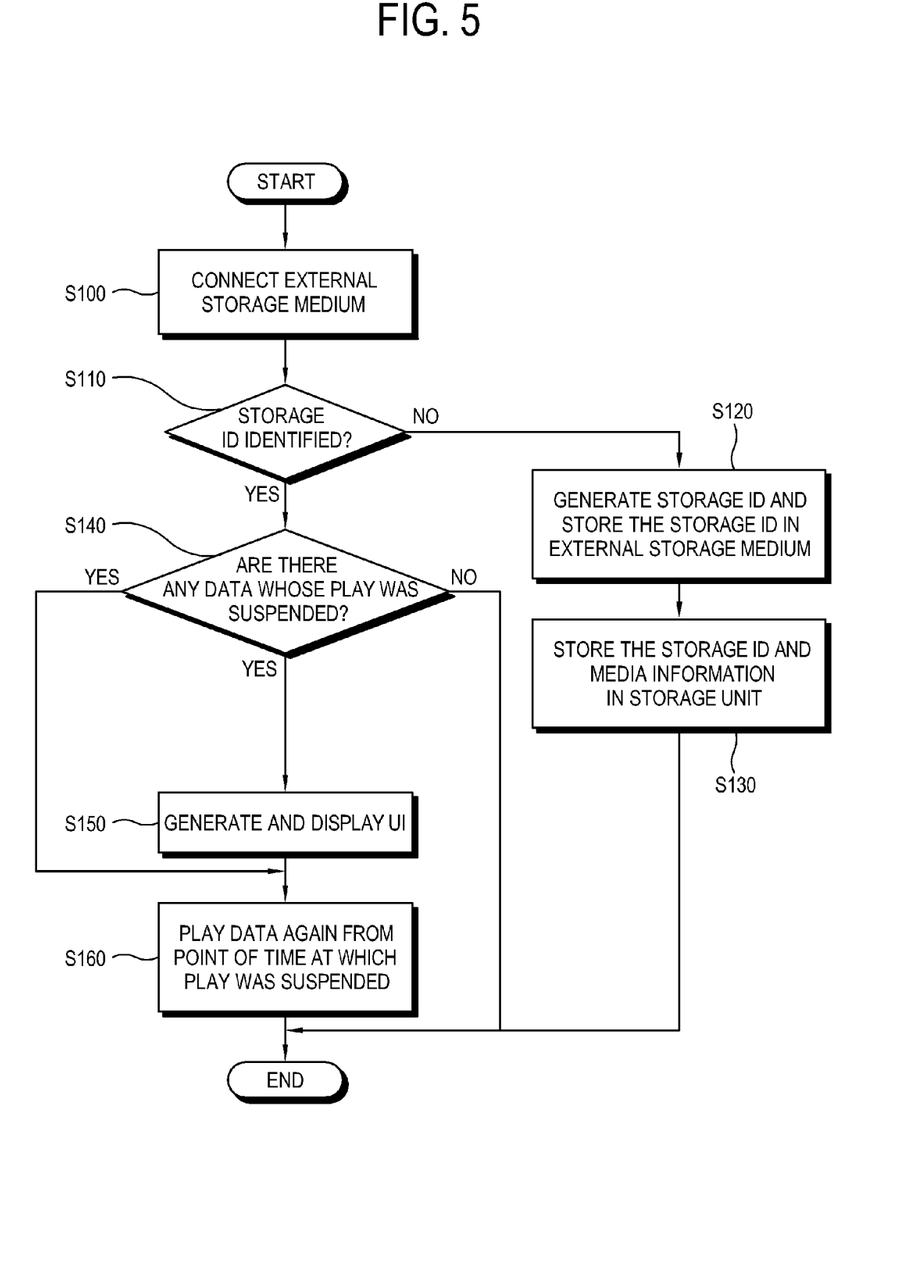
FIG. 5 is a flowchart which illustrates a data control method according to an exemplary embodiment.

FIG. 5 is a flowchart which illustrates the data control method of the electronic device 100 according to an exemplary embodiment.

As shown in FIG. 5, if the external storage medium 200 is connected to the connector 110 of the electronic device 100 (S100), the identification unit 120 detects and identifies the storage ID of the connected external storage medium 200 (S110). If the storage ID is not identified, the ID generator 140 generates a storage ID for the external storage medium 200 to be stored in the external storage medium 200 (S120). The controller 130 then stores the generated storage ID and media information regarding the media data stored in the external storage medium 200 in the storage 150 of the electronic device 100 (S130).

On the other hand, if the identification unit 120 identifies the storage ID of the external storage medium 200 (S110), the identification unit 120 determines whether there is any data whose play was suspended from the media data stored in the external storage medium 200 having the identified ID (S140). If it is determined that data whose play was suspended exists, the controller 130 plays the data again from a point of time at which the play was suspended (S160). The controller 130 generates a UI displaying the type, size and name of the data, time information at a point of time where the play was suspended, a location at a point of time where the play was suspended, or a thumb nail image at a point of time where the play was suspended and displays the generated UI on the display 160 (S150). If the UI is selected by the user input, the data are played again from a point of time where the play was suspended (S160).

For example, the controller 130 generates a list of data whose play was suspended during a certain time and generates a UI displaying a type, a size or a name or a combination thereof of the data in the list, time information regarding a point of time at which the play was suspended, information regarding a location at a point of time at which the play was suspended, or a thumb nail image at a point of time at which the play was suspended, or the like, to display the UI on the display 160 (S150). If one of the media data is selected from the UI by a user input, the selected data are played again from a point of time at which the play was suspended (S160).

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A television device comprising:
 a storage;
 a univeral serial bus (USB) interface configured to connect with an external flash memory device; and
 a controller configured to identify an external flash memory device connected to the USB interface based on identification (ID) information thereof and to perform a function corresponding to the identified external flash memory device,
 wherein the function comprises playing video data stored in the identified external flash memory device from a point of time at which play was last suspended,
 wherein, if play of the video data in the external flash memory device was last suspended prior to a current connection with the interface, the controller plays the video data from the last suspended point of the time based on last suspended information associated with the identified external flash memory device stored in the storage of the television device.

2. The television device according to claim 1, wherein the ID information of the external flash memory device is assigned by the television device.

3. The television device according to claim 2, wherein the controller, if the connected external flash memory device is not identified, controls to generate the ID information of the connected external flash memory device and to transmit the generated ID information to the external flash memory device.

4. The television device according to claim 1,
 wherein the controller stores the ID information of the connected external flash memory device and information about the function corresponding to the identified external flash memory device in the storage.

5. The television device according to claim 4, further comprising:
 a display;
 wherein the controller controls the display to display a user interface (UI) to receive a user input for playing the video data from the point of time at which play was last suspended and to play the video data from the last suspended point of time when the user input is received.

6. A control method of a television device, the control method comprising:
 identifying an external flash memory device connected to a universal serial bus (USB) interface of the television device based on identification (ID) information thereof; and
 performing a function corresponding to the identified external flash memory device,
 wherein the function comprises playing video data stored in the identified external flash memory device from a point of time at which play was last suspended,
 wherein the performing comprises, if play of the video data stored in the external flash memory device was last suspended prior to a current connection with the interface, playing the video data from the last suspended point of time based on the last suspended information associated with the identified external flash memory device stored in a storage of the television device.

7. The control method according to claim 6, wherein the ID information of the external flash memory device is assigned by the television device.

8. The control method according to claim 7, further comprising, if the connected external flash memory device is not identified, generating the ID information of the connected external flash memory device and transmitting the generated ID information to the external flash memory device.

9. The control method according to claim 8, further comprising storing the ID information of the connected external flash memory device and information about the function corresponding to the identified external flash memory device in the storage.

10. The control method according to claim 9, further comprising displaying a user interface (UI) to receive a user input for playing the video data from the point of time at which play was last suspended and to play the video data from the last suspended point of time when the user input is received.

11. An electronic device comprising:
an interface which is connected to an external device;
an identification unit which identifies the external device connected to the interface;
a display; and
a controller which, if the external device is identified by the identification unit, displays information about media data, which corresponds to the identified external device and has been played by the electronic device, on the display,
wherein the electronic device displays a thumbnail image of the media data which indicates a point of time at which play of the media data on the electronic device was last suspended.

12. The electronic device according to claim 11, further comprising:
a user interface (UI) generator,
wherein the controller controls the UI generator to generate a UI displaying the information about the media data, and displays the UI on the display.

13. The electronic device according to claim 12, further comprising:
a user input,
wherein the controller, if the UI is selected by the user input, controls to play the media data based on the information about the media data.

14. The electronic device according to claim 11, wherein information about the media data comprises at least one of a type, a size or a name of the data, or a combination thereof, a list of data played during a certain time, time information on a point of time at which the play was suspended, a suspended location, and a thumb nail image.

15. A control method of an electronic device, the control method comprising:
identifying an external device connected to the electronic device; and
if the external device is identified, displaying information about media data, which corresponds to the identified external device and has been played by the electronic device, on the electronic device,
wherein the electronic device displays a thumbnail image of the media data which indicates a point of time at which play of the media data on the electronic device was last suspended.

16. The control method according to claim 15, further comprising generating a UI displaying the information about the media data and displaying the UI on the electronic device.

17. The control method according to claim 16, further comprising
receiving a user input selecting the UI; and
playing the media data based on the information about the media data.

18. The control method according to claim 15, wherein information about the media data comprises at least one of a type, a size or a name of the data, or a combination thereof, a list of data played during a certain time, time information on a point of time at which the play was suspended, a suspended location, and a thumb nail image.

19. The television device according to claim 1, wherein the controller is configured to play the video data stored in the external flash memory device connected to the USB interface using a viewer program, and to store information regarding a point of time at which play is suspended in connection with the ID information of the external flash memory device.

20. The television device according to claim 19, wherein the function comprises displaying, using the viewer program, a file including the video data that was last displayed.

21. The control method according to claim 6, wherein the performing the function comprises playing the video data stored in the external flash memory device connected to the USB interface using a viewer program, and storing information regarding a point of time at which play is suspended in connection with the ID information of the external flash memory device.

22. The control method according to claim 21, wherein the function comprises displaying, using the viewer program, a file including the video data that was last displayed.

23. The television device according to claim 1, further comprising:
a display,
wherein the controller controls the display to display a user interface (UI) to receive a user input for playing the video data from the point of time at which play was last suspended and to play the video data from the last suspended point of time when the user input is received.

24. The television device according to claim 1, wherein the external flash memory device comprises a USB data storage device with an integrated USB interface.

* * * * *